United States Patent
De Souza et al.

(10) Patent No.: US 9,757,820 B2
(45) Date of Patent: Sep. 12, 2017

(54) WELDING FIXTURE FOR JOINING BAR-WOUND STATOR CONDUCTORS

(75) Inventors: Urban J. De Souza, Rochester Hills, MI (US); Frederick W. Rhoads, Holly, MI (US); Justin Hanson, Dearborn Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 981 days.

(21) Appl. No.: 13/479,728

(22) Filed: May 24, 2012

(65) Prior Publication Data

US 2013/0313239 A1 Nov. 28, 2013

(51) Int. Cl.
*B23K 37/04* (2006.01)
*B23K 101/38* (2006.01)

(52) U.S. Cl.
CPC ...... *B23K 37/0435* (2013.01); *B23K 2201/38* (2013.01)

(58) Field of Classification Search
CPC . B23K 9/02; B23K 9/00; B23K 11/00; B23K 37/04–37/0461; B21J 13/08
USPC ............. 219/121.58, 148, 158, 161, 160
See application file for complete search history.

(56) References Cited

U.S. PATENT DOCUMENTS

| | | | | |
|---|---|---|---|---|
| 3,575,569 A * | 4/1971 | Mitchell et al. | ............... | 219/79 |
| 3,798,407 A * | 3/1974 | Becker | ............... | 219/92 |
| 4,127,759 A * | 11/1978 | Pile et al. | ............... | 219/56 |
| 4,324,515 A * | 4/1982 | Ehling | ............... | 409/300 |
| 4,453,072 A * | 6/1984 | Middleton, Jr. | ............... | B21L 3/02 |
| | | | | 219/86.23 |
| 6,414,479 B1 * | 7/2002 | LaCroix et al. | ............... | 324/173 |
| 6,448,681 B1 * | 9/2002 | Matsunaga et al. | ............... | 310/179 |
| 6,512,195 B2 * | 1/2003 | Domschot | ............... | 219/86.25 |
| 6,639,170 B2 * | 10/2003 | Becherucci et al. | ............... | 219/56 |
| 6,972,505 B1 * | 12/2005 | Leijon et al. | ............... | 310/196 |
| 7,732,734 B2 * | 6/2010 | Machrowicz | ............... | 219/161 |
| 8,674,261 B2 * | 3/2014 | No et al. | ............... | 219/121.85 |
| 2001/0026109 A1 * | 10/2001 | Higashino et al. | ............... | 310/201 |
| 2002/0041129 A1 * | 4/2002 | Oohashi et al. | ............... | 310/179 |
| 2003/0183607 A1 * | 10/2003 | Migliori | ............... | B23K 26/10 |
| | | | | 219/121.63 |

(Continued)

FOREIGN PATENT DOCUMENTS

JP  2002336968 A1 * 11/2002

OTHER PUBLICATIONS

English translation of JP2002336968A1 to Hotoshi Haga published Nov. 2002.*

*Primary Examiner* — Michael LaFlame, Jr.
(74) *Attorney, Agent, or Firm* — Quinn IP Law

(57) ABSTRACT

A fixture assembly for welding a plurality of stator wire end pairs may include an anvil, a movable clamp configured to translate between an unclamped state and a clamped state, a first grounding electrode, and a second grounding electrode. The movable clamp may be configured to urge the plurality of stator wire ends against the anvil when in the clamped state. The moveable clamp includes a separator feature that generally extends toward the anvil. Each of the first grounding electrode and second grounding electrodes may be configured to translate between a clamped state and an unclamped state. When in the clamped state, each of the first and second grounding electrodes is configured to urge a pair of the plurality of stator wire end pairs against the separator feature.

17 Claims, 3 Drawing Sheets

(56) References Cited

U.S. PATENT DOCUMENTS

| | | | |
|---|---|---|---|
| 2005/0230363 A1* | 10/2005 | Debuan et al. | 219/121.63 |
| 2006/0096957 A1* | 5/2006 | Pfiz | 219/121.63 |
| 2006/0231538 A1* | 10/2006 | Rice et al. | 219/136 |
| 2007/0007252 A1* | 1/2007 | Ritter | 219/56 |

* cited by examiner

WELDING FIXTURE FOR JOINING BAR-WOUND STATOR CONDUCTORS

STATEMENT REGARDING FEDERALLY SPONSORED RESEARCH OR DEVELOPMENT

This invention was made with government support under DOE/NETL grant number DE-EE0002629. The invention described herein may be manufactured and used by or for the U.S. Government for U.S. Government (i.e., non-commercial) purposes without the payment of royalties thereon or therefore.

TECHNICAL FIELD

The present disclosure relates to welding fixtures for joining the stator wires of electric devices.

BACKGROUND

Electric devices such as motors and generators having a stator secured within a housing of the motor/generator are well known. A rotor mounted on a shaft is coaxially positioned within the stator and is rotatable relative to the stator about the longitudinal axis of the shaft to transmit the force capacity of the motor. The passage of current through the stator creates a magnetic field tending to rotate the rotor and shaft.

Some stators are generally configured as an annular ring and are formed by stacking thin plates, or laminations, of highly magnetic steel. A copper winding of a specific pattern is configured, typically in slots of the lamination stack, through which current is flowed to magnetize sections of the stator assembly and to create a force reaction that causes the rotation of the rotor.

Bar pin stators are a particular type of stator that include a winding formed from a plurality of bar pins, or bar pin wires. The bar pin wires are formed from a heavy gauge copper wire with a rectangular cross section and generally configured in a hairpin shape having a curved section and typically terminating in two wire ends. The bar pins are accurately formed into a predetermined shape for insertion into specific rectangular slots in the stator, and are typically coated with an insulating material prior to insertion, such that the adjacent surfaces of the pins within the slots are electrically insulated from each other.

Typically, the curved ends of the bar pins protrude from one end of the lamination stack and the wire ends of the bar pins protrude from the opposite end of the lamination stack. After insertion, the portions of the wire protruding from the lamination stack are bent to form a complex weave from wire to wire, creating a plurality of wire end pairs. Adjacent paired wire ends are typically joined to form an electrical connection, such as through a welding operation. The resultant weave pattern and plurality of joints determines the flow of current through the motor, and thus the motive force of the rotor.

SUMMARY

A welding fixture assembly may be utilized for separating, crowding, and grounding a plurality of stator wire ends to receive a weld. The fixture assembly may include an anvil, a movable clamp configured to translate between an unclamped state and a clamped state, a first grounding electrode, and a second grounding electrode. The movable clamp may be configured to urge the plurality of stator wire ends against the anvil when in the clamped state.

The moveable clamp may include a separator feature that generally extends toward the anvil. In one configuration, the separator feature may include a wedge-shaped protrusion. Each of the first grounding electrode and second grounding electrode may be configured to translate between a clamped state and an unclamped state. When in the clamped state, the first grounding electrode is configured to urge a first pair of the plurality of stator wire ends against the separator feature. Likewise, when in a clamped state, the second grounding electrode may be configured to urge a second pair of the plurality of stator wire ends against the separator feature. Each of the first grounding electrode and the second grounding electrode may be electrically coupled with an electrical ground, and may be in electrical communication with the plurality of stator wire end pairs when in a clamped state.

The fixture may further include an electrode actuator that is configured to movably translate each of the first grounding electrode and the second grounding electrode between the respective unclamped and clamped states. Likewise, a similar actuator may be configured to movably translate the movable clamp.

The above mentioned fixture assembly may be used in a system for welding a plurality of stator wire end pairs that further includes an electric welding apparatus including a current source and a welding electrode.

Similarly, a method of fixturing a plurality of stator wire end pairs to receive an electrical weld may include: crowding the plurality of stator wire end pairs between a movable clamp and an anvil, wherein the movable clamp including a separator feature extending toward the anvil; crowding a first pair of the plurality of stator wire end pairs against a first side of the separator feature using a first translatable grounding electrode; crowding a second pair of the plurality of stator wire end pairs against a second side of the separator feature using a second translatable grounding electrode; and electrically coupling each of the first translatable grounding electrode and the second translatable grounding electrode with an electrical ground.

The above features and advantages and other features and advantages of the present invention are readily apparent from the following detailed description of the best modes for carrying out the invention when taken in connection with the accompanying drawings.

DETAILED DESCRIPTION

Figure 1:
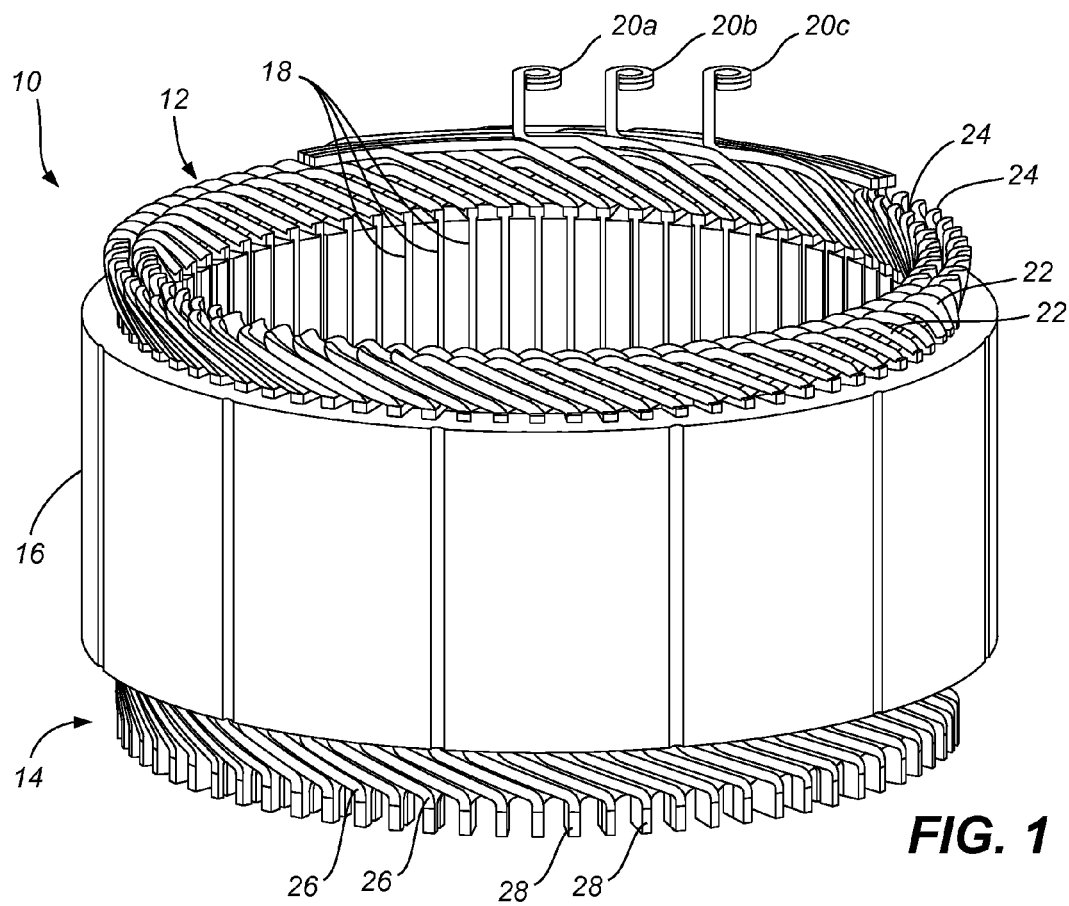
FIG. 1 is a schematic perspective view of a stator assembly prior to joining the wire ends of the stator winding.

Referring to the drawings, wherein like reference numerals are used to identify like or identical components in the various views, FIG. 1 schematically illustrates a stator assembly 10 of an electric machine having a plurality of bar-wound electrical conductor windings (generally at 12). The stator 10 may generally be configured as an annular ring and may be formed from a lamination stack 16 (i.e., a plurality of individual laminations stacked in an ordered manner). Each lamination may include a plurality of radially distributed slots which may be oriented during assembly of the lamination stack 16 to define a plurality of generally rectangular slots 18 through the stator 10. Each slot 18 may be particularly adapted to receive one or more of the conductor windings 12.

As generally illustrated in FIG. 1, the stator 10 may be configured as a bar pin stator, wherein the conductor windings 12 are formed from a plurality of bar pins 24 (also referred to as "bar pin wires 24"). The conductor windings 12 may further include terminals or connections 20a, 20b and 20c, for connecting the various phases of the windings 12 to an electrical controller such as a power inverter module. The bar pin wires 24 are typically formed from a heavy gauge, high conductivity copper wire with a rectangular cross section. Each bar pin wire 24 may generally be configured in a hairpin-type shape that has a curved section 22 at one end and typically terminates in two wire ends 28 at the opposing end. Prior to insertion, the bar pins 24 may be accurately formed into a predetermined shape to construct a predetermined weave pattern after insertion into the slots 18. In one configuration, the bar pins 24 may be coated with an insulating material 26 prior to insertion, such that the adjacent surfaces of the bar pins 24 within the slots 18 are electrically insulated from each other. To facilitate joining of the wire ends 28 to form an electrical connection, the wire ends 28 of the bar pins 24 may be stripped of the insulating layer 26 prior to insertion into the slots 18 of the lamination stack 16 and prior to bending to form a weave pattern such as the weave pattern shown in FIG. 1 and in additional detail in FIG. 2. Each slot 18 may be lined with a slot liner, to insulate the bar pins 24 from the lamination stack 16, and to prevent damage to the insulating layer 26 during insertion of the bar pins 24 in the slots 18.

FIG. 1 shows the curved ends 22 of the bar pins 24 protruding from one end of the lamination stack 16 and the wire ends 28 of the bar pins 24 protruding from the opposite end of the lamination stack 16. The plurality of bent wire ends 28 may generally be referred to as the wire end portion 14 of the stator 10. After insertion, the wire ends 28 protruding from the lamination stack 16 may be bent to form a complex weave of bar pins 24 on the wire end portion 14 of the stator 10. As such, each respective wire end 28 may be paired with and joined to a different wire end 28 according to the connection requirements of the winding 12.

Figure 2:
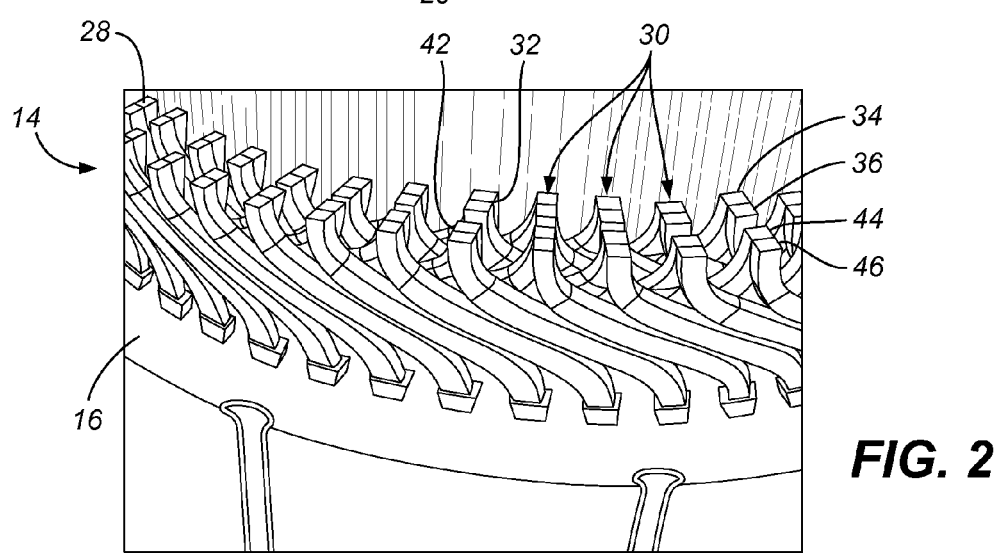
FIG. 2 is a partial schematic perspective view of the wire end portion of the stator assembly of FIG. 1.
Figure 3:
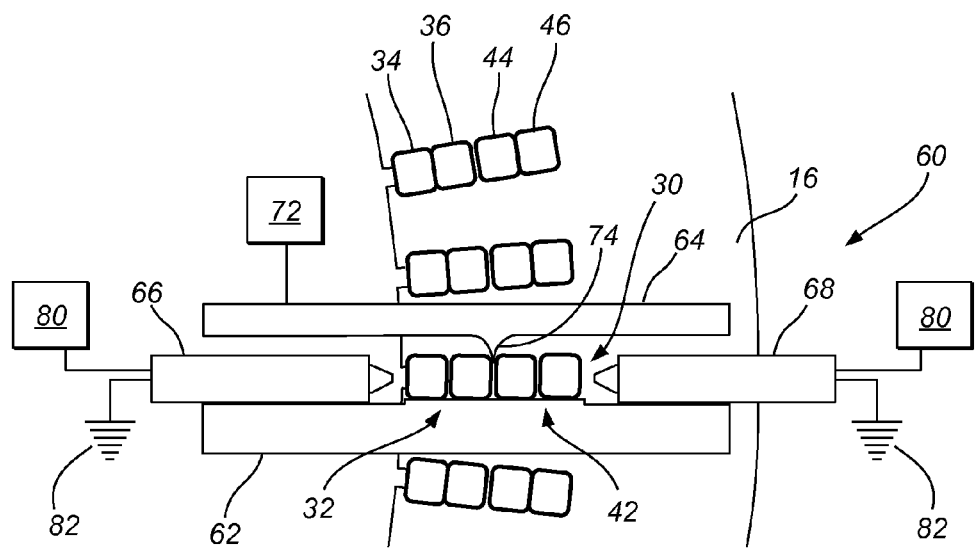
FIG. 3 is a schematic top view of the wire end portion of a stator assembly, with a welding fixture assembly disposed about one row of wire ends in an un-clamped state.

FIG. 2 shows, by way of non-limiting example, a perspective view of the wire end portion 14 of stator 10. As illustrated, the collective wire ends 28 of the bar pins 24 may be arranged in four layers, with each layer being disposed radially outward of the previous layer. For example, the outermost layer may include a plurality of wire ends 28 closest to the outer diameter of the lamination pack 16, and the innermost layer may include a plurality of wire ends 28 closest to the inner diameter of the lamination stack 16. Additionally, the wire ends 28 may be aligned in a plurality of rows 30 that each extend radially outward from the center of the stator 10. As shown in FIGS. 2 and 3, the plurality of wire ends forming the innermost or first layer of the winding 12 are identified as wire ends 34. The second layer of the winding 12, which is proximate to the first layer, is formed of a plurality of wire ends identified as wire ends 36. The third layer of the winding 12 is formed of a plurality of wire ends identified as wire ends 44. The outermost or fourth layer is formed of a plurality of wire ends identified as wire ends 46.

FIG. 2 shows each of the wire ends 34 in the first layer being bent such that it is proximate to and paired with a wire end 36 in the second layer, forming a first, or inner wire end pair 32. The wire ends 34, 36 of the inner wire end pair 32 may be fused together through an electric welding process such as gas tungsten arc welding (GTAW or TIG welding), plasma arc welding (PAW), electric resistance welding (ERW) or other similar processes that may create a mechanical and electrical bond via the delivery of an electrical current.

Similar to the inner wire pair 32, the wire ends 44 of the third layer may be bent such that they are each proximate to, and paired with a wire end 46 in the fourth layer, forming a second, or outer wire end pair 42. The wire ends 44, 46 of the outer wire end pair 44 may be fused together through a welding process that may be similar to the one used to form the inner wire end pair 32.

Figure 4:
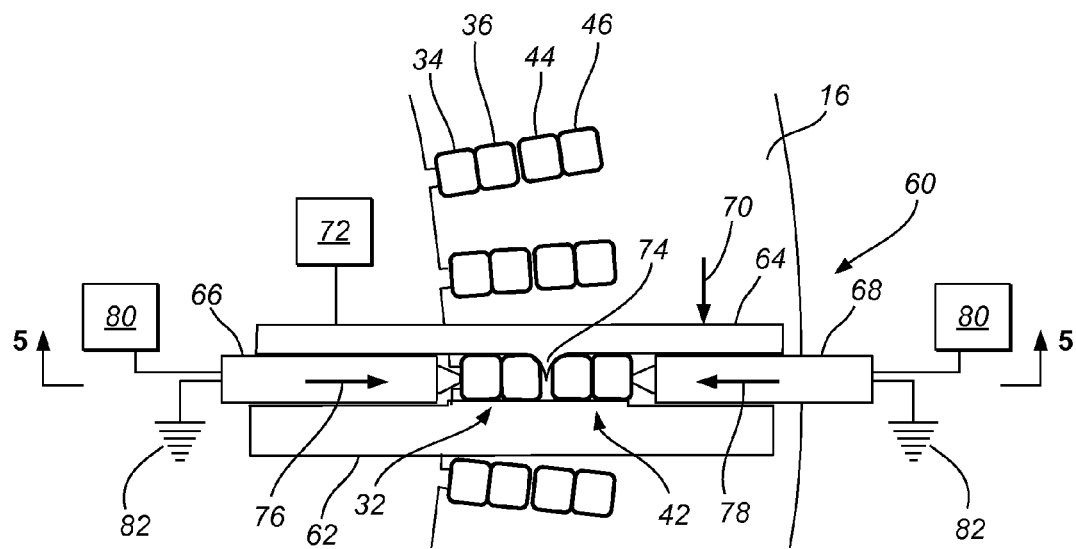
FIG. 4 is a schematic top view of the wire end portion of a stator assembly, with a welding fixture assembly disposed about one row of wire ends in a clamped state.
Figure 5:
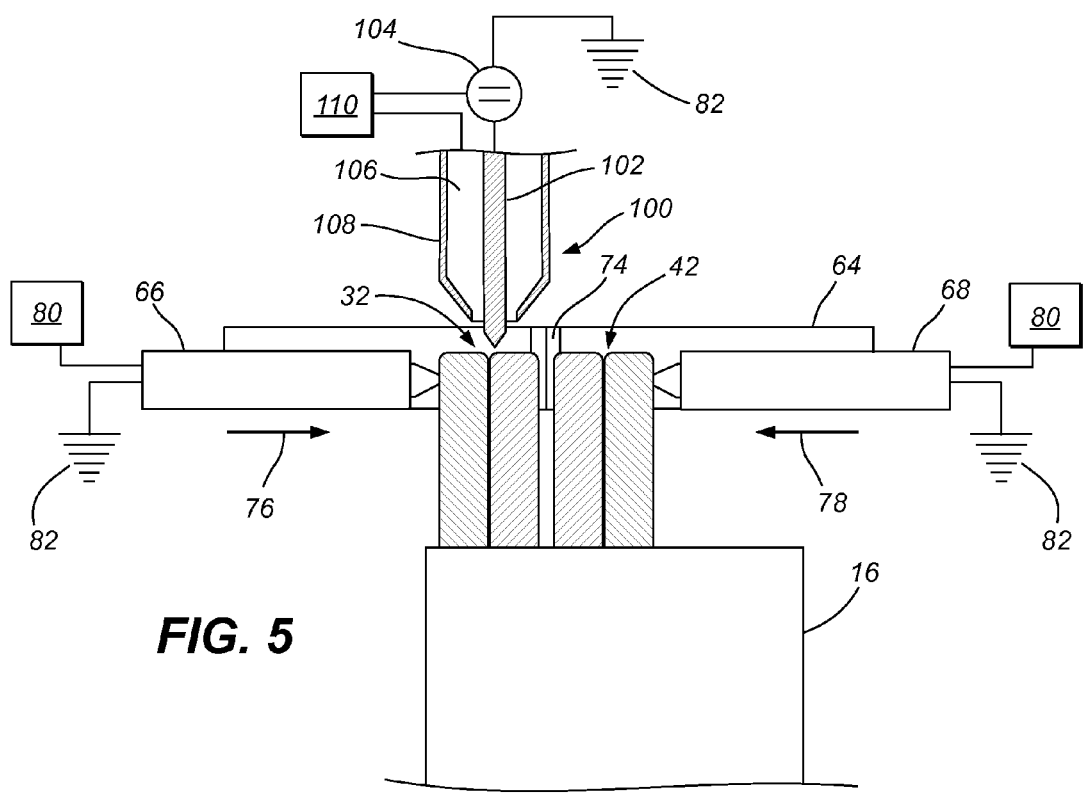
FIG. 5 is a schematic partial cross-sectional view of the stator assembly of FIG. 4, taken along line 5-5, and further illustrating an electric welding assembly.

FIGS. 3-5 illustrate a fixture apparatus 60 that may be utilized when welding the wire ends 28 together to form end pairs 32, 42. As illustrated, the fixture 60 may be selectively transitionable between an unclamped state (FIG. 3) and a clamped state (FIG. 4). When in the clamped state, the fixture 60 may be operative to separate the second wire end 36 from the third wire end 44, to crowd the first wire end 34 against the second wire end 36, and to crowd the third wire end 44 against the fourth wire end 46. Additionally, the fixture 60 may be operative to electrically ground both wire end pairs 32, 42 to facilitate an electrical welding process. As used herein, "crowding" involves forcibly contacting the adjoining wire ends such that a welding operation may be effective in mechanically and/or electrically coupling the ends.

FIG. 3 schematically illustrates an embodiment of the fixture apparatus 60 in the unclamped state. Conversely, FIG. 4 schematically illustrates the same apparatus 60 in a clamped state. Said another way, in FIG. 4, the fixture apparatus has sufficiently been clamped against the wire ends 28 to separate, crowd, and ground the wire pairs 32, 42. Finally, FIG. 5 illustrates a partial schematic cross-sectional view of the apparatus of FIG. 4, taken along line 5-5, and further including an electric welding apparatus 100.

As generally illustrated in FIGS. 3 and 4, the fixture apparatus 60 may include an anvil 62, a movable clamp 64, a first grounding electrode 66, and a second grounding electrode 68. The fixture apparatus 60 may be adapted to generally surround one row 30 of wire ends 28, such that the first grounding electrode 66 is disposed on a radially inward side of the row 30, the second grounding electrode 68 is disposed on a radially outward side of the row 30, and the movable clamp 64 and anvil 62 are disposed on opposite circumferential sides of the row 30. In one configuration, the fixture apparatus 60 may be lowered onto the row 30 in a direction generally parallel to the longitudinal axis of the stator 10. In another configuration, however, various components of the fixture assembly 60 (e.g., the clamp 64 and anvil 62) may move into position relative to the wire ends 28 by translating along a radial axis.

During a fixturing operation, as shown in FIG. 4, the movable clamp 64 may translate in a direction 70 toward the anvil 62 (i.e., from the unclamped state to the clamped state). This translation may correspondingly trap and/or compress the wire ends 34, 36, 44, 46 between the clamp 64 and the anvil 62 while urging them to align along a single row. The translation of the movable clamp 64 may be caused by an actuator 72, which may be either a manual actuator or an electronically controlled actuator. Examples of manual actuators may include spring clamps, toggle clamps, or other such manually actuated clamping devices. Examples of electronically controlled actuators include pneumatic actuators, hydraulic actuators, screw-drive actuators, or other such electronically controlled actuators.

The movable clamp 64 may include a separator feature 74 that may urge the second wire end 36 to remain physically separated from the third wire end 44. The separator feature 74 may be, for example, a wedge-shaped protrusion that may extend from a contact surface of the clamp 64. As the movable clamp 64 is translated toward the anvil 62, the protrusion may either urge the second and third wire ends 36, 44 apart (if they are initially in contact), or may maintain a minimum separation distance between them (if they are initially apart). In one configuration, the anvil 62 may include a similar separator feature or wedge-shaped protrusion (not shown) that may oppose the separator feature 74 of the movable clamp 64.

While the movable clamp 64 is aligning and/or separating the wire ends against the anvil 62, the first and second grounding electrodes 66, 68 may respectively translate toward the wire ends 34, 36, 44, 46 from the unclamped state to the clamped state (i.e., along respective directions 76, 78). In this manner, the first grounding electrode 66 may contact the first wire end 34 and urge it against the second wire end 36. Likewise the second grounding electrode 68 may contact the fourth wire end 46 and urge it against the third wire end 44. The compressing translation of the first and second grounding electrodes 66, 68 may also urge the inner and outer wire pairs 32, 42 against opposing sides of the separator feature 74.

Each grounding electrode 66, 68 may linearly translate under the control of a respective electrode actuator 80. The electrode actuator 80 may be either a mechanical actuator or an electrical actuator, and may enable each grounding electrode 66, 68 to either translate independently, or in unison. Additionally, each grounding electrode 66, 68 may be coupled to an electrical ground 82 that may be capable of receiving a large amount of electrical current (e.g., greater than 250 Amperes). Grounding the electrodes may enable automated welding processes and eliminate the need to separately ground the wire ends.

Once the fixture assembly 60 engages the plurality of wire ends to separate, crowd and ground the end pairs 32, 42, as shown in FIG. 4, a welding apparatus 100 (shown in FIG. 5) may then apply high current electrical energy to each pair 32, 42 in a manner that welds the respective wire ends together. For example, an electrode, such as a tungsten welding electrode 102 may conduct electricity supplied by a current source 104 to the grounded wire ends. The electrode 102 may be surrounded by a continuous flow of inert gas 106 (e.g., argon) that may flow through a nozzle 108 surrounding the electrode 106. In one embodiment, the current source 104 may be electrically coupled with the grounding electrodes 66, 68 either through a direct electrical connection or by way of a common electrical ground 82. As may be appreciated, the electric welding apparatus 100 may weld each pair 32, 42 independent from the other pair. For example, the welding apparatus 100 may first weld the inner wire end pair 32, and may subsequently weld the outer wire end pair 42.

The motion and actuation of the electric welding apparatus 100 may be controlled by a welding controller 110. In one embodiment, the welding controller 110 may include a three-axis positioning device that may be configured to move the electrode 102 in Cartesian directions relative to the wire end pairs 32, 42. Once in proper position (i.e., approximately 1-2 mm separated from the wire ends in the case of a GTAW) the welding controller 110 may selectively energize the current source 104 to create the weld.

Figure 6:
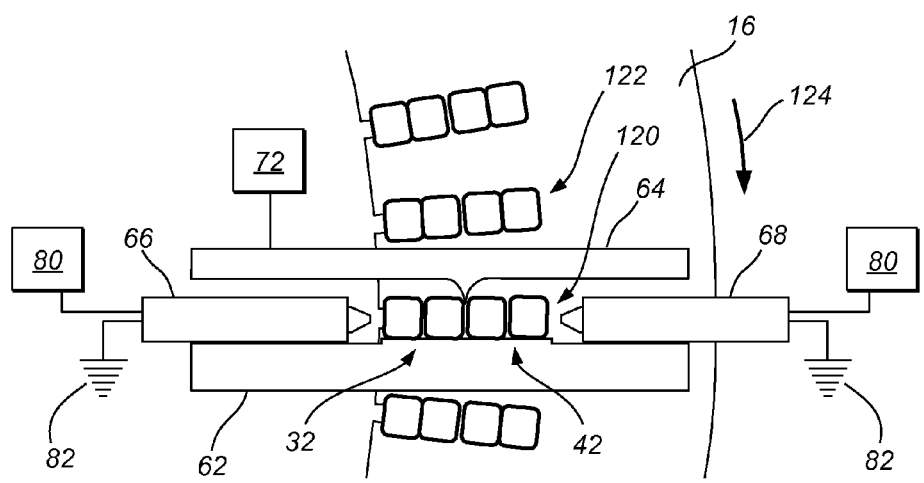
FIG. 6 is a schematic top view of the wire end portion of a stator assembly being rotatably indexed to fixture a new row of wire ends.

Referring to FIG. 6, once the welding apparatus 100 has fused the wire end pairs of one row 120 together, the various actuators may translate the grounding electrodes 66, 68 and movable clamp 64 away from the wire ends 28 (i.e., from the clamped state to the unclamped state) and the fixture apparatus 60 may lift off of the row 30. In one configuration, the stator 10 may be indexed on a rotatable table or fixture, such that an adjacent row (e.g., row 122) may be welded following the welding of row 30. This may be accomplished by controllably rotating the table (and stator assembly) in a corresponding angular direction 124 until the adjacent row 122 is disposed under the fixture assembly 60. In this manner, all end-pairs of the bar wound stator assembly may be welded in an automated manner.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A welding fixture assembly for separating and grounding a plurality of stator wire ends, the fixture assembly comprising:
    an anvil;
    a movable clamp configured to translate between an unclamped state and a clamped state, the moveable clamp including a separator feature extending toward the anvil, and wherein the movable clamp is configured to urge the plurality of stator wire ends against the anvil when in the clamped state;
    a first grounding electrode configured to translate between a clamped state and an unclamped state;
    a second grounding electrode configured to translate between a clamped state and an unclamped state;
    wherein the first grounding electrode contacts a first pair of the plurality of stator wire ends, when in the clamped state, to urge the first pair against the separator feature;
    wherein the second grounding electrode contacts a second pair of the plurality of stator wire ends, when in the clamped state, to urge the second pair against the separator feature; and
    wherein the first pair and second pair of the plurality of stator wire ends are held in a linear arrangement against the anvil when in the clamped state.

2. The welding fixture of claim 1, wherein each of the first grounding electrode and the second grounding electrode are electrically coupled with an electrical ground.

3. The welding fixture of claim 1, wherein the separator feature includes a wedge-shaped protrusion.

4. The welding fixture of claim 1, further comprising an electrode actuator configured to movably translate each of the first grounding electrode and the second grounding electrode between the respective unclamped and clamped states.

5. The welding fixture of claim 4, wherein the electrode actuator is an electronically controlled actuator.

6. The welding fixture of claim 1, further comprising an electrically controlled actuator configured to movably translate the movable clamp.

7. A system for welding a plurality of stator wire end pairs, the system comprising:
a welding fixture assembly including:
an anvil;
a movable clamp configured to translate between an unclamped state and a clamped state, the moveable clamp including a separator feature extending toward the anvil, and wherein the movable clamp is configured to urge the plurality of stator wire end pairs against the anvil when in the clamped state;
a first grounding electrode configured to translate between a clamped state and an unclamped state;
a second grounding electrode configured to translate between a clamped state and an unclamped state;
wherein the first grounding electrode contacts a first pair of the plurality of stator wire ends, when in the clamped state, to urge the first pair against the separator feature;
wherein the second grounding electrode contacts a second pair of the plurality of stator wire ends, when in the clamped state, to urge the second pair against the separator feature; and
wherein the first pair and second pair of the plurality of stator wire ends are held in a linear arrangement against the anvil when in the clamped state; and
an electric welding apparatus including a current source and a welding electrode.

8. The system of claim 7, wherein each of the first grounding electrode, the second grounding electrode, and the current source are electrically coupled with an electrical ground.

9. The system of claim 8, wherein electrical current is configured to flow between the current source, the welding electrode, at least one of the first and second plurality of stator wire end pairs, and at least one of the first grounding electrode and the second grounding electrode.

10. The system of claim 7, wherein the separator feature includes a wedge-shaped protrusion.

11. The system of claim 7, further comprising an electrode actuator configured to movably translate each of the first grounding electrode and the second grounding electrode between the respective unclamped and clamped states.

12. The system of claim 11, wherein the electrode actuator is an electronically controlled actuator.

13. The system of claim 7, further comprising an electrically controlled actuator configured to movably translate the movable clamp.

14. A method of fixturing a plurality of stator wire end pairs to receive an electrical weld, the method comprising:
crowding the plurality of stator wire end pairs between a movable clamp and an anvil such that the plurality of stator wires are held in a linear arrangement against the anvil, the movable clamp including a separator feature extending toward the anvil;
crowding a first pair of the plurality of stator wire end pairs against a first side of the separator feature using a first translatable grounding electrode that contacts the first pair;
crowding a second pair of the plurality of stator wire end pairs against a second side of the separator feature using a second translatable grounding electrode that contacts the second pair; and
electrically coupling each of the first translatable grounding electrode and the second translatable grounding electrode with an electrical ground.

15. The method of claim 14, wherein each of the first translatable grounding electrode and the second translatable grounding electrode are in communication with an electronic actuator; and
wherein the electronic actuator is configured to translate each of the first translatable grounding electrode and the second translatable grounding electrode between an unclamped state and a clamped state.

16. The welding fixture of claim 1, wherein the first pair includes a first stator wire end and a second stator wire end;
wherein the second pair includes a third stator wire end and a fourth stator wire end;
wherein the separator feature is operative to separate the second stator wire end from the third stator wire end when in a clamped state;
wherein the first grounding electrode contacts the first stator wire end when in a clamped state to crowd the first stator wire end against the second stator wire end; and
wherein the second grounding electrode contacts the fourth stator wire end when in a clamped state to crowd the fourth stator wire end against the third stator wire end.

17. The system of claim 7, wherein the first pair includes a first stator wire end and a second stator wire end;
wherein the second pair includes a third stator wire end and a fourth stator wire end;
wherein the separator feature is operative to separate the second stator wire end from the third stator wire end when in a clamped state;
wherein the first grounding electrode contacts the first stator wire end when in a clamped state to crowd the first stator wire end against the second stator wire end; and
wherein the second grounding electrode contacts the fourth stator wire end when in a clamped state to crowd the fourth stator wire end against the third stator wire end.

* * * * *